US012645988B2

(12) United States Patent
Sharma et al.

(10) Patent No.: US 12,645,988 B2
(45) Date of Patent: Jun. 2, 2026

(54) SYSTEMS AND METHODS FOR ADAPTING PLATFORM BEHAVIOR USING MACHINE-LEARNING-BASED REMOTE ENTITY LIFECYCLE MONITORING

(71) Applicant: Capital One Services, LLC, McLean, VA (US)

(72) Inventors: Amita Sharma, Potomac, MD (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 945 days.

(21) Appl. No.: 17/929,290

(22) Filed: Sep. 1, 2022

(65) Prior Publication Data

US 2024/0078466 A1     Mar. 7, 2024

(51) Int. Cl.
*H04L 12/58* (2006.01)
*G06F 16/951* (2019.01)
*G06N 20/00* (2019.01)

(52) U.S. Cl.
CPC ........... *G06N 20/00* (2019.01); *G06F 16/951* (2019.01)

(58) Field of Classification Search
CPC .......... G06N 20/00; G06N 3/045; G06N 3/08; G06F 16/951
See application file for complete search history.

(56) References Cited

U.S. PATENT DOCUMENTS

| | | | | |
|---|---|---|---|---|
| 11,146,609 | B1 * | 10/2021 | Shevchenko | ........... G06F 40/20 |
| 11,842,286 | B2 * | 12/2023 | Manda | .................... G06N 3/045 |
| 2020/0336450 | A1 * | 10/2020 | Gao | ...................... H04L 51/043 |
| 2022/0253345 | A1 * | 8/2022 | McClure | ................. G06F 9/541 |
| 2023/0054924 | A1 * | 2/2023 | Brown | ................. G06N 3/0475 |
| 2023/0267223 | A1 * | 8/2023 | Trivedi | ............... G06F 21/6218 726/29 |
| 2024/0037458 | A1 * | 2/2024 | Rodriguez | ............ G06F 18/217 |
| 2024/0160953 | A1 * | 5/2024 | Manda | ...................... G06N 5/01 |
| 2024/0214341 | A1 * | 6/2024 | Gao | ........................ H04L 51/18 |
| 2025/0245430 | A1 * | 7/2025 | Jeon | .................... G06F 16/9027 |

FOREIGN PATENT DOCUMENTS

WO     WO-2021092656 A1 *     5/2021     .......... G06Q 30/016

* cited by examiner

*Primary Examiner* — Hassan Mrabi
(74) *Attorney, Agent, or Firm* — Foley & Lardner LLP

(57)     ABSTRACT

Platform behavior may be adapted via machine-learning-based entity lifecycle monitoring. A web crawler agent collects data comprising an entity identifier token. A machine learning model is trained to determine, based at least in part on the entity identifier token, whether a corresponding entity is associated with the computing platform (e.g., whether the corresponding entity is a platform subscriber entity for the computing platform). Based on the output of the machine learning model applied to the entity identifier token (in some embodiments, in combination with other relevant data parsed from the collected data), an indication of an entity lifecycle status and a confidence value therefor are determined. Based on the entity lifecycle status and the confidence value, a listener is bound to the platform subscriber entity. The listener monitors activity of the platform subscriber entity with respect to the platform and identifies platform action to take in response.

20 Claims, 7 Drawing Sheets

450

100

200

| Threshold ID 203 | Threshold 206 | Rule 209 |
|---|---|---|
| 221 | Predicted response time is less than four hours | Send as soon as possible |
| 222 | Predicted response time is more than four hours and less than twenty four hours | Send next when user is next available |
| 223 | Predicted response time is more than twenty four hours | Send at close of business |

Receive request
605

Execute web crawler
610

Extract values from captured data
to fill fields
615

Compares values in fields with
platform subscriber entities
620

Determine confidence of match
625

Modify platform subscriber entity
to include listener condition
630

In response to listener trigger,
automatically deny requested
network operation
635

SYSTEMS AND METHODS FOR ADAPTING PLATFORM BEHAVIOR USING MACHINE-LEARNING-BASED REMOTE ENTITY LIFECYCLE MONITORING

BACKGROUND

Distributed computing environments may include communicatively coupled computing entities. The computing entities may exchange data and/or electronic signals via a network. In an internet-of-things (IoT) arrangement, an example computing environment may include a network of entities, also sometimes referred to as IoT nodes, IoT motes, connected devices, and/or connected entities, where devices may include one or more sensors to collect environmental data, software for managing the sensors, and/or transceivers for transmitting the collected data to computing hubs. Some example arrangements may include smart manufacturing plants, smart power grids, connected homes, connected consumer devices, and remote monitoring arrangements. Example implementations of connected environments may include networks of wired connected entities, ad-hoc networks (e.g., wireless sensor networks (WSN), Mobile Ad-Hoc Networks (MANET)) or various combinations thereof.

Connected devices can be instrumental in edge computing arrangements. In edge computing, certain application logic may be offloaded to the "edges" of a network (e.g., to the connected devices rather than or in addition to a computing hub) for energy efficiency. For instance, WSN networks may be segmented into subsets having "sinks". A "sink" can be thought of as a computing device with increased computing capabilities relative to peripheral connected devices.

Connected devices may be powered by portable power supply units, such as non-rechargeable batteries, which may decrease the lifecycle of individual connected devices. Furthermore, wirelessly connected mobile devices may not be reliably connected to a network at all times. In order to secure networks of connected devices and/or prevent fraud, it is desirable to be able to determine the lifecycle status of connected devices with an acceptable degree of accuracy. If a connected device is determined to have expired, future network operation requests initiated from the connected device may be a result of device spoofing and should be denied. A computing hub or, in edge computing environments, a designated connected device (the "sink"), may be configured to manage multiple IoT devices, and may periodically ping these devices to determine whether they are live. Responding to frequent ping requests may further decrease the lifespan of resource-constrained connected devices as well as available network bandwidth.

SUMMARY

To address these and other issues, disclosed herein are systems, methods, and computer-readable media for adapting platform behavior using machine-learning-based remote entity lifecycle monitoring.

A computing platform may provide network services, also sometimes referred to as network operations, to one or more entities. In certain arrangements, an entity may have a previously established identity record (e.g., an account record, a user record, a device enrollment record, etc.) with a computing platform that provides network services. In such arrangements, the entity may be referred to as a platform subscriber entity. Example network services may include device management functionality (e.g., deployment of software and/or firmware updates, etc.), identity management functionality (e.g., provisioning of entity account identifiers, deactivation of entity accounts, management of allowable network functions, etc.), and/or application delivery (e.g., deployment of applications to a connected device, delivery of an allowable feature set of a software application to a requestor via a suitable interface, etc.). Network services may further include data and/or signal ingress functionality (e.g., processing of inbound electronic signals from connected entities, receipt of data transmissions from connected entities, etc.). Network services may further include data and/or signal egress functionality (e.g., initiation and/or routing of outbound electronic signals to connected entities, initiation and/or routing of data transmissions to connected entities, etc.).

In an embodiment, a platform may comprise (in whole or in part), and/or receive data from, an entity discovery agent structured to collect data regarding lifecycle status of platform subscriber entities. The entity discovery agent may comprise circuitry (e.g., executable code, memory, processor, computer-readable media, etc.) structured to actively and/or passively monitor connected entities. Active monitoring may include initiating a network connection with a platform subscriber entity. Passive monitoring may include receiving information provided (e.g., broadcast, transmitted, etc.) by live connected entities. In some arrangements, connected entities may periodically broadcast lifecycle status to other entities on a network, and the lifecycle status information may be discoverable by the entity discovery agent by scanning the network at predetermined time intervals. In some arrangements, the entity discovery agent is a web crawler.

The entity discovery agent may collect data regarding one or more connected entities. In some arrangements, the data may include an entity identifier token. The entity identifier token may include one or more values from a suitable character encoding schema (e.g., ASCII, Unicode, etc.) that identify the platform subscriber entity.

According to various arrangements, the entity identifier token may include any or a combination of an entity identifier, entity name, and entity connectivity information. For instance, in some arrangements, the entity identifier token may be determined by the entity discovery agent by parsing (e.g., extracting information from, segmenting, etc.) a data set. In some arrangements, the data set may include data broadcast by various connected entities to a particular network or network segment. In some arrangements, the data set may include network traffic data. The network traffic data may include any suitable data from or associated with a data packet (a unit within network traffic data), such as any data from a header, a footer, metadata, and/or a payload of a packet. Some examples of network traffic data include HTTP routing information, TLS routing information, SSL routing information, SMTP routing information, one or more routing identifiers specific to the TCP, UDP, SCTP, ICPMv4, ICMPv6 protocols, an IP address, and/or data link-layer routing information, such as a MAC address, VLAN ID, VLAN priority, port number, etc. These elements, in whole or in part, may be included in entity identifier tokens.

In some arrangements, the entity identifier token, individually or in combination with other elements, may uniquely identify the platform subscriber entity within a population (e.g., within a subscriber population of the platform, within a network, within a set of entities, within a geographical locality, etc.). For instance, referring to the connected device example, an entity identifier token may include an IP address and/or a MAC address assigned to the entity. In some arrangements, the entity identifier token, individually or in combination with other elements, may identify the platform subscriber entity with a reasonable degree of certainty (e.g., using maximum likelihood estimation or another suitable uncertainty quantification approach, based on a numerical probability value exceeding a predetermined numerical value, such as at least 50%, etc.). For instance, referring to the connected device example, the entity identifier token may include a subnet identifier, a domain name, etc. and other supplemental information, such as device type, logged in user information, etc. In combination, these values may identify a particular device with a reasonable degree of certainty as determined by a machine learning model.

The machine learning model disclosed herein may be trained to determine, based at least in part on the entity identifier token, whether a corresponding entity may be associated with the computing platform (e.g., whether the corresponding entity is a platform subscriber entity for the computing platform). The machine learning model may be computer-based and may be embodied in suitable form, such as, for example, as computer-executable code, circuitry, non-transitory storage media, etc. According to various arrangements, the machine learning model may be structured to receive inputs and provide outputs. The outputs of the machine learning model may include computer-generated predictions, which may improve in accuracy over time. The predictions may include predictions regarding entity lifecycle, such as lifecycle status (e.g., based on the last observed time alive), remaining entity lifespan (e.g., based on remaining battery life information collected by the entity discovery agent), etc. The predictions may also include predictions regarding the likelihood that an entity identified by a non-unique entity identifier token matches one or more items in a database of platform subscriber entities (i.e., whether an entity discovered by the entity discovery agent has a preexisting relationship with the computing platform). For instance, referring to the connected device example, the entity discovery agent may determine a MAC address of a particular computing device on a network. The computing device may be a multi-function device and/or may be shared by a plurality of users (e.g., individuals, automated computer-executable job agents, etc.). Accordingly, the MAC address may not be sufficient to uniquely identify a particular subsystem, resource or user that has a corresponding platform subscriber entity profile. The machine learning model may receive the entity identifier token and other relevant data as an input and determine various combinations of these data items that are likely to identify a corresponding subscriber entity profile with the highest degree of certainty or within an acceptable tolerance. In some arrangements, the combinations (e.g., MAC address and logged-in user, MAC address and time of day, etc.) are ranked based on the degree of certainty for a potential match.

If an entity discovered by the entity discovery agent is reasonably certain to have a corresponding platform subscriber entity profile, then based on the output of the machine learning model (in some embodiments, in combination with other relevant data parsed from the collected data), an indication of an entity lifecycle status and a confidence value (e.g., degree of certainty, confidence level, a numerical score, etc.) therefore can be determined. Various supplemental information may be used to determine the entity lifecycle status. For instance, referring to the connected device example, information regarding a history of interactions between the entity and the platform may be retrievably stored in data storage media associated with the platform. The information may include a "last seen live" status (e.g., a timestamp associated with the most recent status broadcast captured from an entity, the most recent response to a ping, etc.). The information may further include a last captured battery status, battery model, projected processing workload of the connected device, projected battery life remaining, etc. The information may further include connected device schedule, such as uptime/downtime cycle information, scheduled maintenance information, etc. For instance, if an entity does not broadcast its status or does not respond to a connection request within a predetermined time interval, the machine learning model may be trained to use additional data, such as entity schedule data, to determine whether the connected entity is likely to be offline temporarily rather than permanently.

Based on the entity lifecycle status and the confidence value corresponding to the entity lifecycle status projected by the machine learning model, a listener may be bound to the platform subscriber entity that corresponds to the entity identifier token. The listener monitors activity of the platform subscriber entity with respect to the platform and identifies platform action to take in response. Platform action may include denying network operations to dubious entities when the previously determined entity lifecycle status indicates that network operation requests are fraudulent (e.g., are a result of entity spoofing).

One or more listener conditions may be associated with a particular listener. A listener condition may be triggered by a future interaction of the platform subscriber entity with the computing platform. The future interaction may be a network operation (e.g., a request for a network service). In some arrangements, binding a listener to a platform subscriber entity includes configuring the listener to capture all network operations by a platform subscriber entity. For instance, if the machine learning model determines that a particular connected device may be permanently offline, all future connection requests that comprise identifying information associated with the connected device may be denied by the computing platform. In some arrangements, binding a listener to a platform subscriber entity includes configuring the listener to capture specific network operations by a platform subscriber entity. For instance, a connected device may be allowed to provide but not receive data, all communications from the connected device may be quarantined such that the provided data is scrubbed for malicious executable code or other evidence of fraud, etc. In some arrangements, binding a listener to a platform subscriber entity includes configuring the listener to capture network operations that may be allowable but require additional authentication.

Various other aspects, features, and advantages of this disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows a table with example thresholds for determining when to initiate an electronic communication to a platform subscriber entity to gather further information regarding entity lifecycle status, in accordance with some embodiments.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
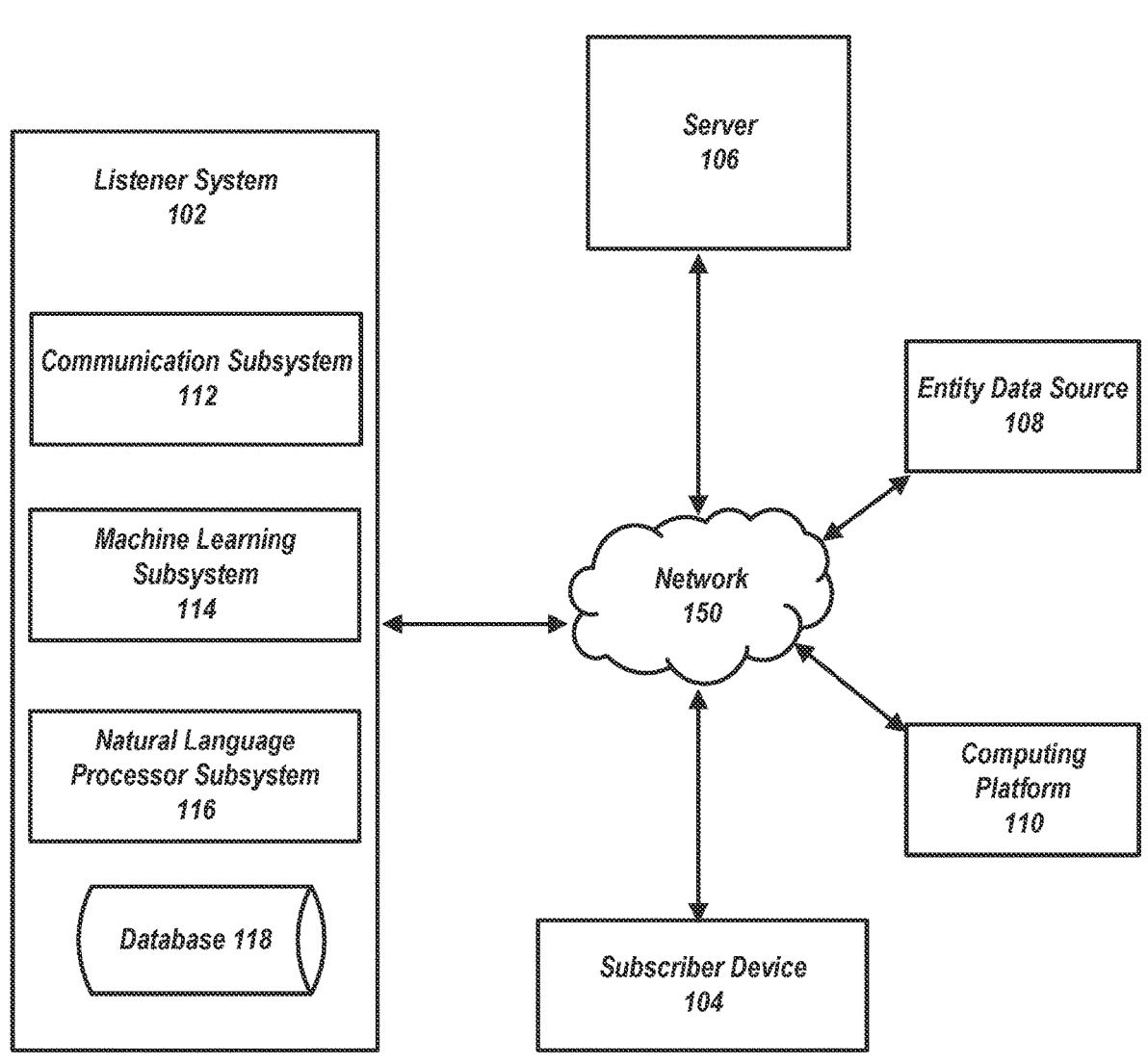
FIG. 1 shows an example computing environment for machine-learning-based entity lifecycle monitoring, in accordance with some embodiments.

FIG. 1 shows an example computing environment 100 for machine-learning-based entity lifecycle monitoring, in accordance with some embodiments. As a general overview, the computing environment 100 is shown to include a listener subsystem 102, subscriber device 104, server 106, entity data source 108, computing platform 110, and/or other components. These computing systems are communicatively coupled via the network 150 and include specialized circuitry to, individually or in combination, perform the systems and methods of the present disclosure. By way of example, the operations performed by various components of computing environment 100 may include executing an entity discovery agent (e.g., web crawler) to return an entity identifier token, determining, using machine learning, that a match exists between an entity identifier token and a platform subscriber entity, determining a confidence value associated with a match, determining relevant network operations for a subscriber entity, binding a specially configured listener to a subscriber entity, and, in response to determining that a listener condition has been triggered, automatically denying or restricting a network operation to a platform subscriber entity. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

Referring now to specific components of the example arrangement of FIG. 1, the listener subsystem 102 is shown to be in a communicative networked relationship, via the network 150, with the subscriber device 104, server 106, entity data source 108, and computing platform 110. The network 150 may be the Internet, a wireless network, a mobile phone network, a mobile voice or data network (e.g., a 5G or LTE network), a cable network, a public switched telephone network, a combination of these networks, or another type of communications network or combination of communications networks. The devices in FIG. 1 (e.g., listener subsystem 102, the subscriber device 104, and/or the server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

The listener subsystem 102, either alone or in combination with any of the computing systems described herein, may perform the operations of machine-learning-based entity lifecycle monitoring for various entities, such as subscriber devices 104. In some arrangements, the listener subsystem includes or is included in, at least in part, the computing platform 110. In some arrangements, the listener subsystem 102 and the computing platform 110 may have dedicated computing resources, such as those of FIG. 5, which may be implemented, for example, as the server 106. In some arrangements, the listener subsystem 102 and the computing platform 110 may be co-located or otherwise share some or all computing resources. As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.).

The entities monitored by the listener subsystem 102 may be in a subscriber relationship with the computing platform 110 and/or may otherwise utilize computing resources and/or applications provided by the computing platform 110. Such computing resources and/or applications may include, without limitation, databases, applications, emulators, executables, application programming interface (API) code, and any other suitable software, middleware and/or firmware deployable to or accessible by platform subscriber entities. In some arrangements, the platform subscriber entities may include or be associated with one or more subscriber devices 104. Each subscriber device 104 may include any of the computing resources described in reference to FIG. 5. Each subscriber device 104 may embody, at least in part, a connected entity or may be associated with a connected entity. In one example use case, a subscriber device 104 may be a connected internet-of-things (IoT) or internet-of-persons (IoP) entity and the computing platform 110 may be a hub configured to manage a plurality of subscriber devices 104. In another example use case, a subscriber device 104 may be associated with a partner or customer entity, and the computing platform 110 may be in a business relationship with the partner or customer entity (e.g., a supplier/purchaser relationship, provider/consumer relationship, etc.). More generally, according to various arrangements, each subscriber device 104 may include any type of mobile terminal, fixed terminal, or other device. By way of example, a subscriber device 104 may include a desktop computer, a notebook computer, a tablet computer, a smartphone, a wearable device, an IoT node, an IoT mote, or other computing device.

The entities monitored by the listener subsystem 102 may include one or more entity data sources 108, which may be associated with or included in subscriber devices 104 or implemented as stand-alone systems. The one or more entity data sources 108 may provide primary or supplemental data regarding platform subscriber entities. In some arrangements, the supplemental data may include one or more entity identifier tokens and entity lifecycle information. In one example use case, entity lifecycle information may include device and/or computing system lifecycle information, battery status, battery model, projected processing workload of the connected device, projected battery life remaining, etc. In another example use case, entity lifecycle information may include information related to individuals, such as national identifier (e.g., a social security number, a tax ID number, a financial account number), name, contact information (phone number, email address, social networking handle(s), etc.), username, date of birth, address, etc. Entity lifecycle information may further include obituary information or similar information available via public records (e.g., location of death, an age of death of decedent, a birthdate, a city and/or state of residence, a name of a surviving family, etc.).

As shown, the listener subsystem 102 may include a communication subsystem 112, a machine learning subsystem 114, a natural language processor (NLP) subsystem 116, and/or a database 118. The communication subsystem 112 may receive electronic messages from the server 106. An example electronic message may include text and/or metadata associated with the message. For example, the metadata may indicate a user device or user that sent the message, the user and/or user device that is intended to receive the message, and/or a timestamp (e.g., indicating when the message was sent or when the message was received by the listener subsystem 102). A person skilled in the art would understand that listener subsystem 102 may reside on its own device or be hosted on a server 106 or subscriber device 104. In some embodiments, the listener subsystem 102 may have some components hosted on server 106 and some components on subscriber device 104. Furthermore, the claimed operations may be performed by any computing device shown in FIG. 1, including the listener subsystem 102, subscriber device 104, server 106, and/or computing platform 110.

The listener subsystem 102 may bind listeners to platform subscriber entities. The listeners may be configured to detect entity-individualized listener conditions. According to various arrangements, listener conditions may represent electronic requests to perform various network operations. An example network operation may include a system action, such as a ping request, data access request, data transmission, transaction, API function call, a call to a remote system, etc. Example network operations may further include computer-based invocation of financial transactions. In some arrangements, a listener condition is a subscriber account setting that captures, via the listener subsystem 102, one or more network operations related to a given user's account. In such cases, network operations may include actions taken by the user or by third parties with respect to the user. In some arrangements, the listener categorizes actions observed by type or purpose. The characterization enables filtering of the actions and subsequent handling thereof. In some arrangements, actions taken by the user or third parties may trigger response actions by the platform. A listener condition that screens for particular types or purposes of actions configured to enable the platform to sort the actions into a subset that are processed and a subset that are denied.

The machine learning subsystem 114 may generate a vector representation of the message received by the communication subsystem 112. The message may include data returned by the entity discovery agent. The vector representation may be generated using a message model. The message model may be trained (e.g., as discussed in more detail below) to map similar messages to similar vectors (e.g., vectors that are within a threshold cosine distance from each other). The vector representation may be indicative of the text and/or the metadata of the message. For example, messages with similar semantic meaning may be mapped to similar vector representations.

The machine learning subsystem 114 operates using one or more machine learning models. As used herein, "model", "machine learning model", and like terms refer to one or more special-purpose computer-based entities (e.g., files, executables, macros, apparatuses, etc.) capable of recognizing patterns and formulating computer-based predictions based thereon. The machine learning subsystem 114 may include trained regression, pattern recognition, and/or classification models structured to generate subscriber entity lifecycle status predictions. Some examples of machine learning models can include neural networks (e.g., a deep neural network (DNN), a convolutional neural network (CNN), a recurrent neural network (RNN) such as a long short-term memory (LSTM) model, combinations thereof, etc.), trained regression models (e.g., linear regression, sparse vector machine (SVM) models, logistic regression, polynomial regression, ridge regression, Lasso regression, Bayesian linear regression, etc.), or other types of classifiers (e.g., naïve Bayes, decision trees, k-nearest neighbors (kNN), extreme gradient boost (XGBoost) models, etc.).

In some arrangements, the models of the machine learning subsystem 114 are trained in order to operate. In some arrangements, model training makes use of training data sets and/or few-shot data sets. Training data typically includes a significant number of examples that a human could not feasibly read and/or review (e.g., over 10 thousand, over 100 thousand, over a million, etc.). Within artificial intelligence (AI) and machine learning, two approaches to training exist: supervised learning and unsupervised learning. The main difference is one uses labeled data to help predict outcomes, while the other does not. However, there are some nuances between the two approaches, and the areas in which one outperforms the other. Supervised learning is a machine learning approach defined by the use of labeled datasets. These datasets are designed to train or "supervise" algorithms into classifying data or predicting outcomes accurately. Using labeled inputs and outputs, the model can measure its accuracy and learn over time. Unsupervised learning uses machine learning algorithms to analyze and cluster unlabeled data sets. These algorithms discover hidden patterns in data without the need for human intervention (hence, they are "unsupervised").

The machine learning subsystem 114 may include a computer-executable entity discovery agent, which may be embodied as a communication subsystem 112. The entity discovery agent (e.g., a web crawler) may include a transceiver and programmable circuitry structured to collect and/or process electronic messages. In some arrangements, the entity discovery agent may include a network traffic parser. In some arrangements, the entity discovery agent may include a text message parser. The entity discovery agent may be structured to access and programmatically interact with an entity data source 108 in order to extract an entity identifier token and/or other supplemental information that allows the listener subsystem 102 to identify a platform subscriber entity. In some arrangements, the entity discovery agent is a web crawler.

As shown, the listener subsystem 102 may include a natural language processing (NLP) subsystem 116. In arrangements where the data obtained from the entity data source 108 is unstructured data (e.g., predominantly text-based narratives), the NLP subsystem 116 may be trained to parse a set of text data such as that found in an obituary or a data aggregator. Accordingly to various embodiments, text data can include one or more characters, such as ASCII characters, Unicode characters, etc. The NLP subsystem 116 may be trained to identify what sort of text a given string is (e.g., a name, a date, an address, etc.) and to whom that string pertains (e.g., the subject of the text or ancillary individuals). As elements of a set of text data are identified and categorized, those elements may be slotted into fields that are subsequently supplied to the machine learning subsystem 114 in order to identify whether to apply a listener to a particular platform subscriber entity. The NLP subsystem may make use of a few-shot learning model in order to identify the type of a given text string. The term "few-shot" refers to a model that is trained to interpret a few sources of input data that the model has not necessarily observed before. Few-shot is shorthand for stating that the model has "a few shots" to determine what the user is seeking. "A few" does not necessarily refer to "three" as is often implied, but a relatively small number when compared to other models known in the art. More generally, few-shot learning (FSL) refers to the training of machine learning algorithms using a very small set of training data (e.g., a handful of images), as opposed to the very large set that is more often used. In some arrangements, text types across a few-shot may be detected based on the model's perception of expressed traits within that few-shot. If each entry in the few-shot includes a two-digit number, a slash, a second two-digit number, a second slash, then a four-digit number, then a final input matching that schema will have a high confidence of belonging to the same text type.

Figure 3:
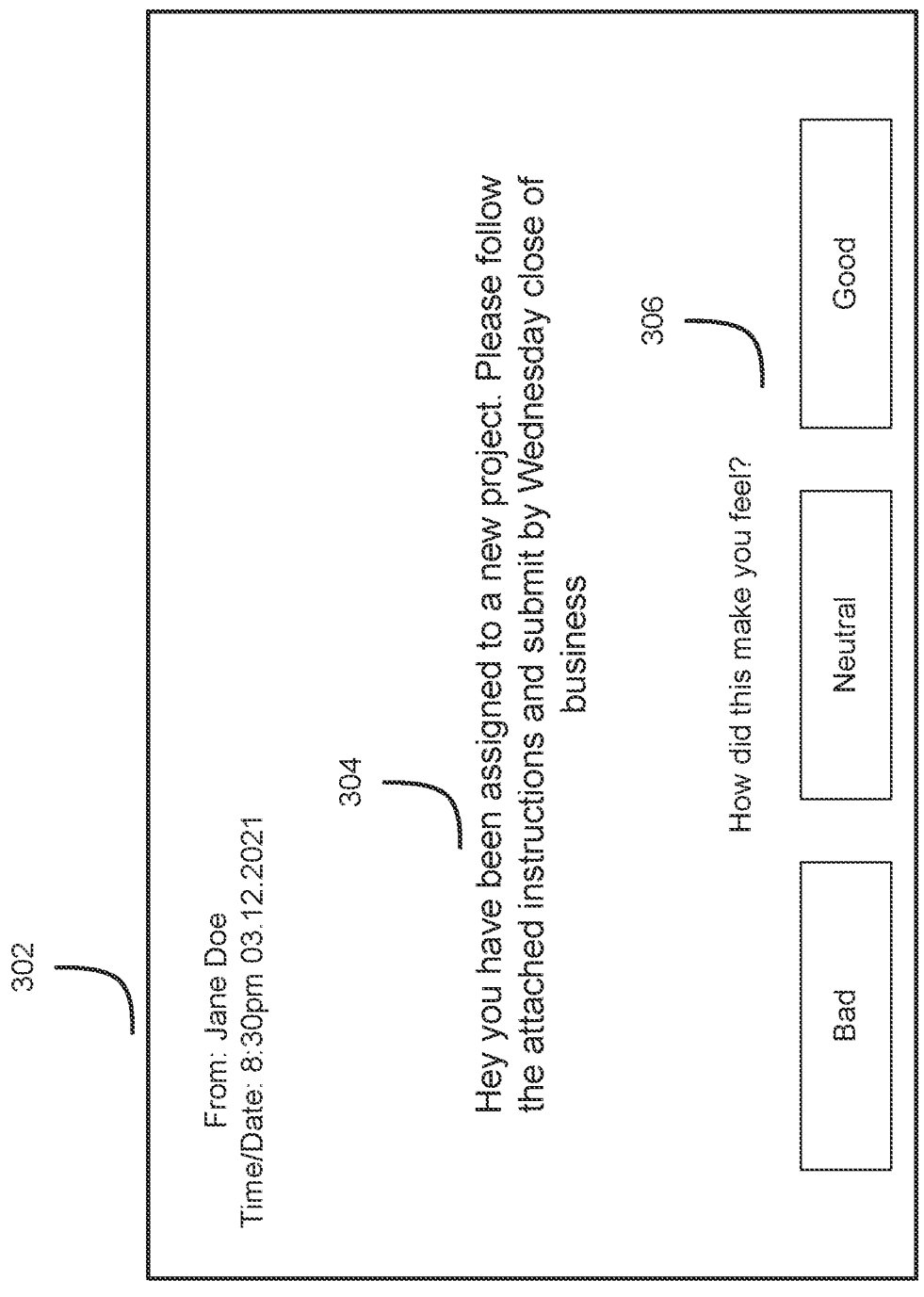
FIG. 3 shows an example user interface for enabling a remote entity subscriber to interact with the computing system of FIG. 1, in accordance with some embodiments.

Referring now to FIGS. 2 and 3, FIG. 2 shows a table with example thresholds for determining when to initiate an electronic communication to a platform subscriber entity to gather further information regarding entity lifecycle status, in accordance with some embodiments. FIG. 3 shows an example user interface for enabling a remote entity subscriber to interact with the computing system of FIG. 1, in accordance with some embodiments. As a general overview, in order to bind the listeners to appropriate platform subscriber entities, the listener subsystem 102 may be structured to ascertain that the lifecycle status of entities is accurately predicted by the machine learning subsystem 114 based on data received from the entity data source 108. To that end, additional operations to verify lifecycle status directly with target entities may be performed.

The additional operations sufficient to verify entity lifecycle status may be recommended via machine learning using one or more machine learning model(s). One of skill will appreciate that, although multiple models are described herein for clarity, the various model(s) may be implemented, in various configurations, segmentations, and/or combinations as one or more machine learning models. Further, individual models may be trained using training datasets that include relevant data. Example machine learning models discussed herein include a matching model, a behavior block model, a fraud model, a messaging model, and a predictive interaction model, also discussed further herein with respect to FIG. 4B.

One example of a machine learning model is a matching model. In some arrangements, the information collected by the entity discovery agent may, at least in part, include a text-based electronic message. The machine learning subsystem 114 may input the vector representation of the message into a matching model to obtain a confidence of a match to a given token identified from text data. In some arrangements, the token is an entity identifier token. In some arrangements, the entity identifier token is a text string, such as a company identifier, the name of an individual, a domain name, etc. In some arrangements, a confidence value is based on the rarity of a particular combination of characters within a particular population (e.g., a geographical population, a population of entities with historical records of network operations retrievably stored (e.g., capable of being accessed, viewed, processed, executed, etc.) in the database 118, etc.).

Another example of a machine learning model is a behavior block model. A behavior block model determines whether one or more network operations observed by a listener are allowable or denied. In one example arrangement, the input to the behavior block model may be historical data regarding system interactions between the subscriber device 104 and computing platform 110 (e.g., pings, handshakes, API calls, electronic data interchange (EDI) transactions, etc.). In another example arrangement, platform subscriber entities may be individuals. The input to the behavior block model may be a set of user interaction data, such as transaction data, and the model may identify what sort of transaction the data represents (e.g., whether the transaction is a single purchase or a recurring payment). Further, if the purchase is a recurring payment, a determination may be made whether the payment is for a service (such as one a deceased individual has no need of) or whether the recurring payment is for the preservation of property (e.g., a mortgage payment). More generally, the model may identify the transaction type based on existing past transactions for the user account and the name of the charging entity. The name of the charging entity may be used to identify the universe of allowable transactions available to such an entity.

Another example of a machine learning model is a fraud model. Network operations requested by subscriber devices 104 may be filtered through a fraud model to predict whether the requested operation is authorized or fraudulent. In an example use case, an IoT device (e.g., subscriber device 104) may send an electronic message to the computing platform 110 and request a network operation. The electronic message, embodied as one or more IP traffic packets, may be intercepted by the listener subsystem 102. The electronic message may include a subscriber identifier token, such as an IP address. The IP address may be parsed to identify a particular subnet mask. The fraud model may have previously been trained to recognize that communications from addresses on the corresponding subnet are likely fraudulent. Accordingly, the fraud model may determine that the subscriber device 104 is likely spoofed and deny the requested network operation. In another example use case, a network operation request may be an unauthorized attempt to invoke a transaction. For instance, fraudulent charges may be common on accounts of deceased users as there is typically no one around to contest the charge. The fraud model may identify behavior on a subscriber account that is unlikely to serve a good-faith purpose and block that behavior by denying the requested network operation.

Another example of a machine learning model is a messaging model. The messaging model may determine a most likely entity interaction or message to send to the entity to elicit a response, as shown with respect to example FIGS. 2 and 3. For example, in a certain use case, the listener subsystem 102 may be implemented to crawl publicly available data to determine whether account holders (e.g., subscribers) to the computing platform 110 are deceased. In such scenarios, the machine learning subsystem 114 may parse an individual's name from an obituary data set returned by the entity discovery agent. The machine learning subsystem 114 may determine that more than one account holder has a particular name. The machine learning subsystem 114 may calculate a confidence value indicative of the expected accuracy level of the prediction that the deceased individual is the account holder. If a match confidence that a given user has died is below a predetermined threshold (e.g., below 7/10, below 70%, is within a certain qualitative category, etc.), the computing platform 110 may seek to elicit some action from the account holder.

As shown with respect to FIGS. 2 and 3, there may be multiple dimensions to the messaging model. First, there may be a predicted interaction having the highest response rate relative to other interactions with an entity; however, the expected response rate of the highest available response rate may still be below a threshold to provide meaningful information to the computing platform 110. A second dimension is determining whether the highest expected response rate is predictive of an entity or individual's lifecycle status. Accordingly, another example of a machine learning model is a predictive interaction model. The predictive interaction model may generate a predicted response time for a message sent to a particular subscriber device 104. The predicted response time may indicate a quantity of time predicted to transpire between a first time at which a notification is presented to the user and a second time at which a response is predicted to be received.

To further illustrate the predictive interaction model, the communication subsystem 112 may provide notifications to the subscriber device 104 (e.g., the user device associated with the user that is the intended recipient of the message). The communication subsystem 112 may provide the notification based on the time determined by the machine learning subsystem 114. In some cases, the time that a notification is sent to a user increases the odds that the user responds. Thus, identification of the correct time to send a notification can be a factor in identifying the highest percentage chance of eliciting a response from the user. However, a further aspect to the communication subsystem 112 is identifying when not to send notifications to the user, as those notifications are likely to offend or upset the user (presuming the user is alive). The communication subsystem 112 may receive, from the user device and/or the user, feedback information that may be used to improve response time predictions. The feedback may be used, for example, to adjust (e.g., train) the machine learning models. The feedback information may indicate a preferred time for receiving the message notification. For example, the user may indicate, via the user device, that the notification should have been sent earlier, later, or at a time specified by the user (e.g., during a lunch break, after 5 pm, on the weekend, etc.). The preferred time may be inferred by the listener subsystem 102. For example, if the user has responded to notifications for similar messages within a threshold time (e.g., 1 hour), then the listener subsystem 102 may determine that the preferred time for the notification is as soon as the listener subsystem 102 can provide the notification. In some arrangements, the feedback information may further include sentiment information. In some arrangements, the feedback information may be implicit. For example, the listener subsystem 102 may use the actual response time of the user as the feedback information. The listener subsystem 102 may store the actual response time(s), the associated message(s), and/or metadata of the message(s) in the database 118 and may use them to generate training data for the machine learning model.

Figure 4A:
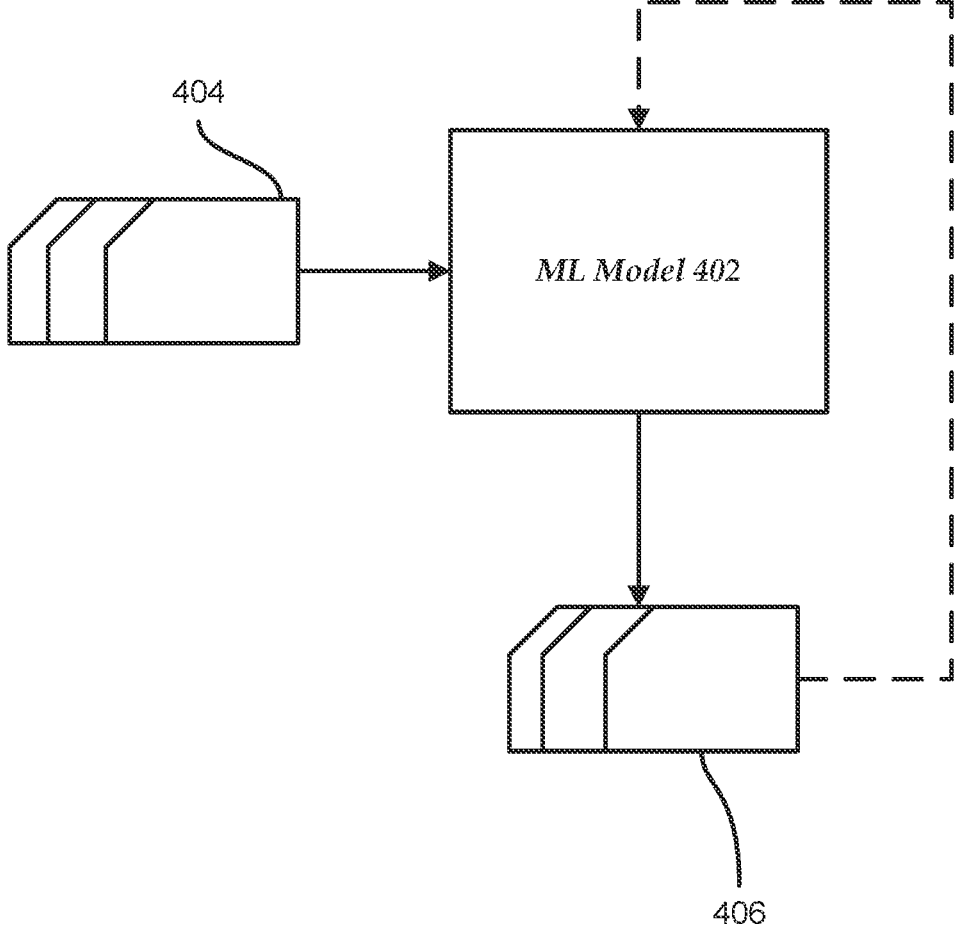
FIG. 4A shows an example machine learning model for entity lifecycle monitoring, in accordance with some embodiments.

Referring now to FIG. 4A, an example machine learning model for entity lifecycle monitoring is shown, in accordance with some embodiments. The machine learning model 402 may accept inputs 404 and provide outputs 406. Although the present disclosure does not contemplate limiting the universe of acceptable data inputs, example inputs may include system and/or transactional information provided by any of the subscriber device 104, entity data store 108, and/or computing platform 110 of FIG. 1. Additional inputs may include historical and/or behavioral information, which may be retrievably stored in the database 118 of FIG. 1. Inputs may include, for example, network traffic data, public data regarding entities accessible, via the Internet, from one or more entity data sources 108, restricted-access data regarding entities retrievably stored by the computing platform 110, etc. Although present disclosure does not contemplate limiting the universe of acceptable outputs of example machine learning models described herein, example outputs may include platform subscriber entity identifier(s), predicted entity lifecycle status, temporal and/or supplemental information associated with the predicted entity lifecycle status, a list of recommended listener conditions to apply to a platform subscriber entity, a list of network operations and recommended system action (e.g., allow, deny, quarantine, manual review, etc.) for a platform subscriber entity, deployable code implementing a custom listener for a platform subscriber entity, etc.

In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network as described below, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate results (e.g., response time predictions, sentiment identifiers, urgency levels, etc.) with better recall and/or precision.

In some embodiments, the machine learning model 402 may include an artificial neural network. In such embodiments, machine learning model 402 may include an input layer and one or more hidden layers. Each neural unit of the machine learning model may be connected with one or more other neural units of the machine learning model 402. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 402 may be self-learning and/or trained, rather than explicitly programmed, and may deliver more accurate results in certain areas of problem solving, as compared to computer programs that do not use machine learning.

During training, an output layer of the machine learning model 402 may correspond to a classification, and an input known to correspond to that classification may be fed into an input layer of machine learning model. During testing, an input without a known classification may be fed into the input layer, and a determined classification may be output. For example, the classification may be a predicted entity lifecycle status (dead, alive, online, offline, etc.), sentiment identifier of a message (e.g., happy, angry, exciting, negative, positive, neutral, etc.), an urgency level (e.g., low, medium, high, etc.), or a predicted response time (e.g., the user is predicted to respond in less than 24 hours, the user is predicted to respond in more than 24 hours, etc.). The machine learning model 402 trained by the machine learning subsystem 114 may include one or more embedding layers at which a message is converted into one or more vector representations (e.g., the vector representation of the message as discussed above). The one or more vector representations of the message may be pooled at one or more subsequent layers to convert the one or more vector representations into a single vector representation.

The machine learning model 402 may be structured as a factorization machine model. The machine learning model 402 may be a non-linear model and/or supervised learning model that can perform classification and/or regression. For example, the machine learning model 402 may be a general-purpose supervised learning algorithm that the system uses for both classification and regression tasks. In some arrangements, the machine learning model 402 may include a Bayesian model configured to perform variational inference, for example, to predict response time as described above.

Figure 4B:
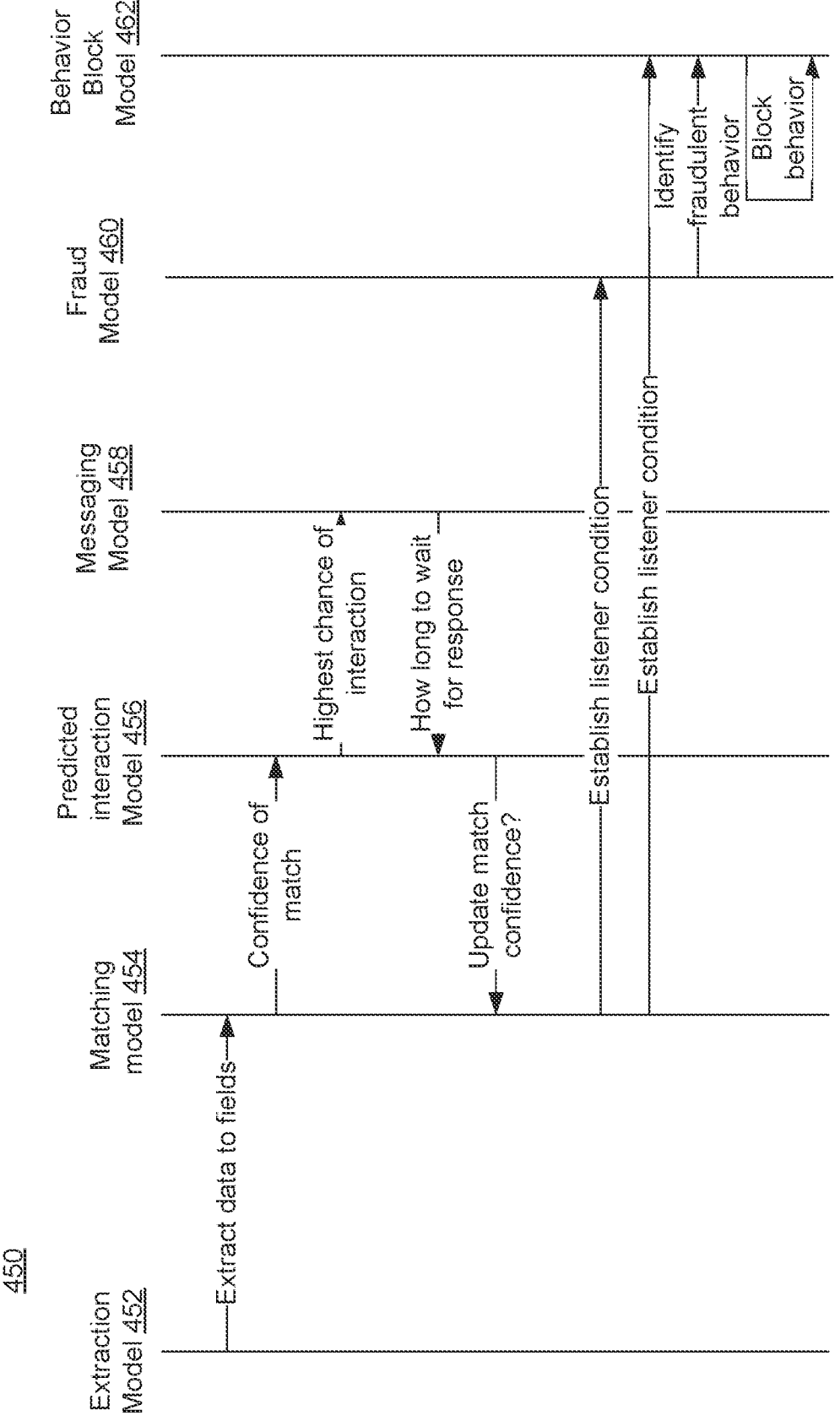
FIG. 4B shows an example of model interaction in entity lifecycle monitoring, in accordance with some embodiments.

Referring now to FIG. 4B, an example of model interaction in entity lifecycle monitoring is shown, in accordance with some embodiments. As an illustrative example, six separate models are depicted, but, more generally, any suitable number of models is contemplated. These models may be separate or combined, at least in part, in a single model. In various embodiments these can be any of machine learning models, hidden Markov models, heuristic models, or convolutional neural networks, including few-shot models. As shown, the six illustrative models include an extraction model 452, a matching model 454, a predictive interaction model 456, a messaging model 458, a fraud model 460, and a behavior block model 462.

In a given interaction, initially, the extraction model 452 identifies data elements from the entity data source 108. In some arrangements, the data elements include one or more values from a suitable character encoding schema (e.g., ASCII, Unicode, etc.). In some arrangements, data fit into a set of predetermined fields of electronic messages returned by the entity discovery agent, such as a web crawler. The values in the predetermined fields may be used by the matching model 454 to identify whether the extracted data matches a given platform subscriber entity. The matching model 454 may be trained to identify a confidence of the match by using multiple facets of the platform subscriber entity's data.

Where the confidence of the match is not sufficient to identify that there is a match, the platform makes use of the predictive interaction model 456 to predict an interaction the platform can take which will have the highest chance of entity response. The predictive interaction model 456 makes use of the messaging model 458 to further identify the best opportunity to send an electronic transmission to a target entity and how long to wait for a response.

Based on whether a response is received, the matching model 454 may update (e.g., increase, decrease, change, etc.) the confidence value of a match to the platform subscriber entity. Where the confidence of a match meets a predetermined threshold, a listener condition may be applied to the platform subscriber entity's account. The listener condition may filter certain account behavior. The filtering criteria may be informed by the fraud model 460 and/or the behavior block model 462. The fraud model 460 may identify what sort of behavior appears fraudulent based on the entity's history and the presence of the listener condition. Based in part on what the fraud model 460 identifies as fraudulent activity, and in part based on filtered recurring account activity behavior, the behavior block model 462 may identify which behavior observed by the listener to deny.

Figure 5:
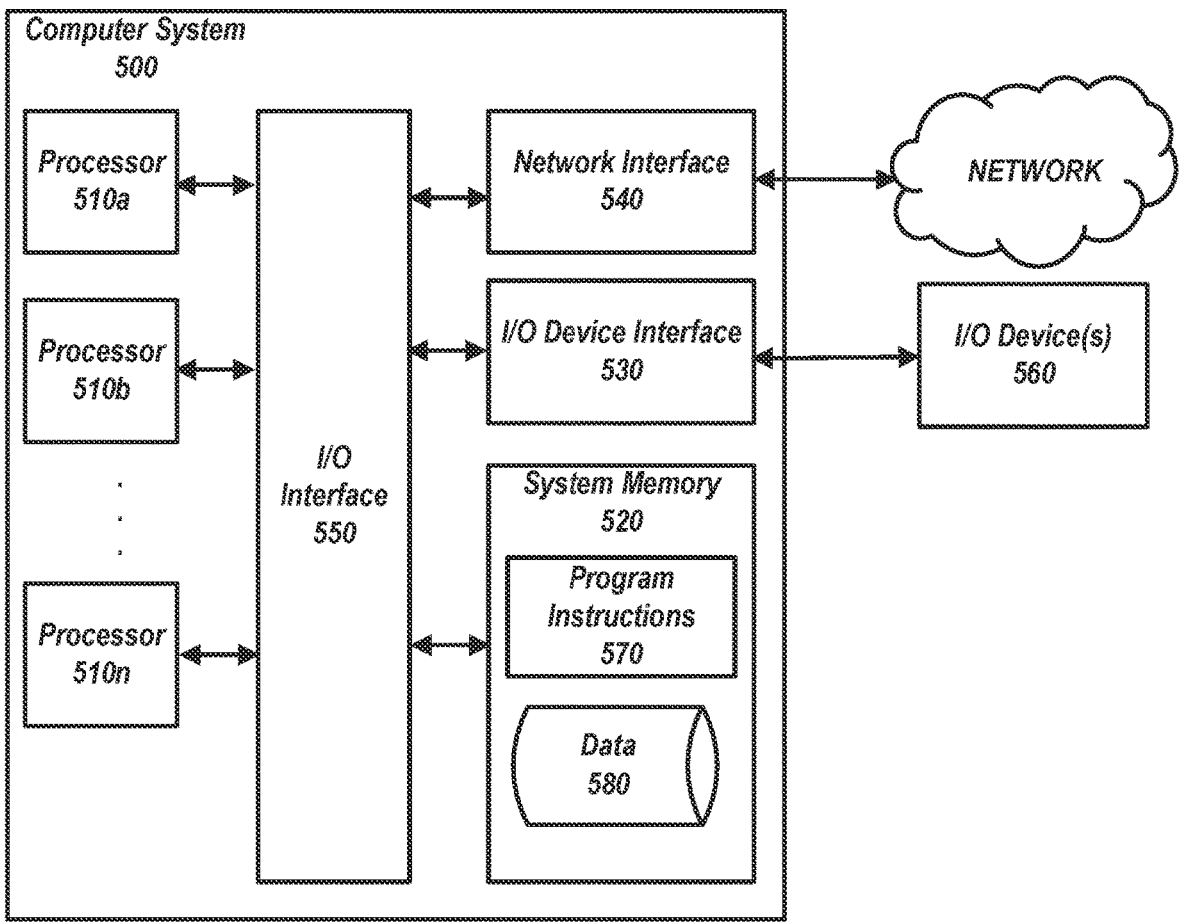
FIG. 5 shows an example computing system of FIG. 1, in accordance with some embodiments.

Referring now to FIG. 5, a diagram is shown that illustrates an example computer system 500 in accordance with embodiments of the present disclosure. Various portions of systems and methods described herein, may include or be executed on one or more computer systems similar to computer system 500. Further, processes and modules described herein may be executed by one or more processing systems similar to that of computer system 500.

Computer system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computer system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface +540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 6:
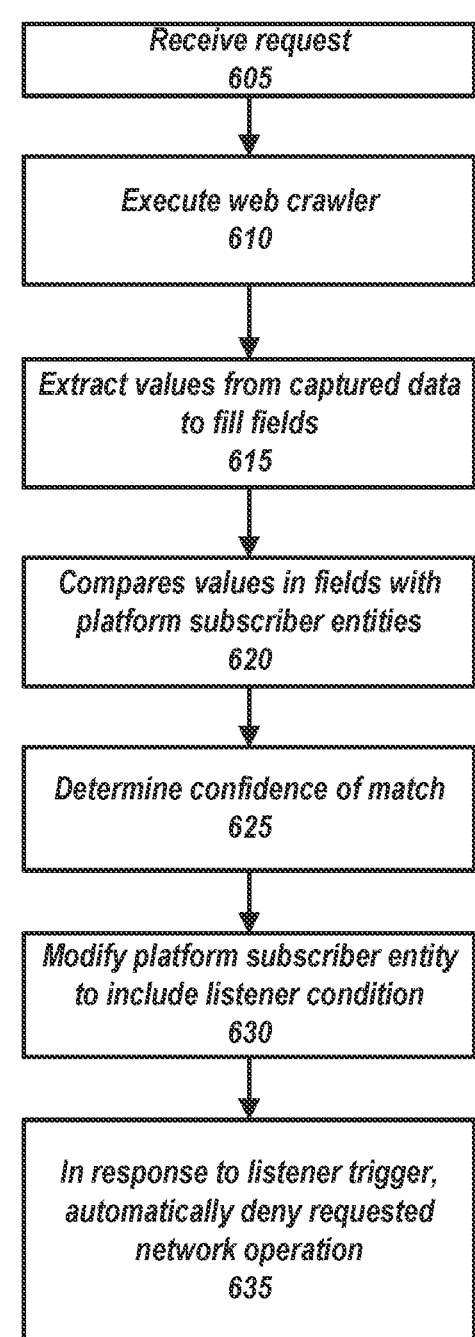
FIG. 6 shows an example flowchart of operations involved in machine-learning-based entity lifecycle monitoring, in accordance with some embodiments.

Referring now to FIG. 6, an example flowchart of operations involved in machine-learning-based entity lifecycle monitoring is shown, in accordance with some embodiments. For example, process 600 may represent the actions taken by one or more devices shown in FIGS. 1-5 and described above. At 605, listener subsystem 102 (e.g., using one or more components in the computing environment 100 (FIG. 1) and/or computer system 500 via network interface 540 (FIG. 5)) receives a message. The message may comprise text and metadata indicating a sender of the message, the user device intended to receive the message, and/or a timestamp. In an example use case, the message may include a request to verify the lifecycle status of a particular platform subscriber entity or a plurality of entities. In some arrangements, process 605 is skipped such that entity lifecycle monitoring is performed for the entire universe or subset of entities associated with the computing platform 110 rather than on-demand for a specific entity.

At 610, the platform may execute a web crawling agent to collect text data from the Internet. In some arrangements, rather than a web crawler, data is obtained from an aggregator platform. At 615, from the text data, the platform extracts values associated with predetermined fields from via natural language processing, the predetermined fields including an entity identifier token. Some arrangements include additional fields. Where the text data sought is obituary data, the additional fields may include a location of death, an age of death of decedent, a birthdate, a city and/or state of residence, and/or a name of surviving family member(s).

At 620, the platform may compare a value stored in the predetermined fields with data associated with a set of platform subscriber entities. The comparison may identify matches or partial matches, thereby identifying a platform subscriber entity as matching to the entity identifier token of the text. Other fields may be used to match as well. The existence of other fields may enable the model to improve confidence of matches by, for example, achieving an increased probability or degree of certainty that a match is true. Accordingly, in some embodiments, the platform may additionally train a machine learning model to identify a confidence score of the match to the entity identifier token and a given platform subscriber entity based on a token rarity index and/or based on similarity between other predetermined fields. The training process may implement a supervised training scheme and training data of varied combinations of the predetermined fields. One illustrative example is a match of the entity identifier token and a birthdate field but, more generally, any data item captured by the web crawler can be used. Token rarity may be based on the overall incidence of given tokens within a population or sub-population.

Based on the above-described comparing, at 625, the platform may determine the confidence score of a match to the entity identifier token of the given platform subscriber entity using the machine learning model. In response to the confidence score exceeding a threshold, at 630, the platform may modify the platform subscriber entity to indicate a listener condition. The modification may include programmatically binding a listener to a platform subscriber entity by making executable code associated with the listener available for execution in connection with a particular platform subscriber entity.

Accordingly, the listener condition may implement a user listener to the platform subscriber entity. The listener may be triggered by a subset of future interaction with the platform subscriber entity. The subset of future interaction is determined by a second machine learning model that implements training data of suspicious interactions of platform subscriber entities connected to the user listener. The subset of future interaction refers to a set of requested network events that a platform subscriber entity is enabled to take with respect to an account. Where the platform is a banking or credit platform, requested network events can include making purchases, or processing recurring payments, changing account info and the like.

In response to triggering of the user listener, at 635, the platform may automatically deny the subset of future interaction with the platform subscriber entity. Where the listener represents that the platform subscriber entity is believed to be deceased, the system may determine that some account action is either unnecessary or fraudulent. The platform may determine that a given user has likely passed away via the use of the machine learning model(s), and then uses that information to deny certain account activity. In the given circumstance of a death to a platform subscriber entity, there is some account activity that is likely fraudulent (e.g., significant purchases), some account activity that is unnecessary (e.g., recurring service payments) and other account activity that is necessary (e.g., mortgage payments). Necessary actions are those that fall outside the subset of account action that the listener observes for.

Various other aspects, features, and advantages of the disclosure will be apparent through the detailed description of the disclosure and the drawings attached hereto.

It is contemplated that the actions or descriptions of FIG. 6 may be used with any other embodiment of this disclosure. In addition, the actions and descriptions described in relation to FIG. 6 may be performed in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments. It should be noted that any dependent embodiment below may also incorporate one or more features of one or more preceding embodiments that depend on the same independent embodiment.

1. A method comprising: executing a web crawling agent that collects text data from the Internet, the text data comprising a first portion; extracting values associated with predetermined fields from the first portion, the predetermined fields comprising an entity identifier token; comparing at least a portion of the entity identifier token with data associated with a set of platform subscriber entities comprising at least one platform subscriber entity; training a first machine learning model to determine a confidence value for a match between the entity identifier token and a platform subscriber entity from the set of platform subscriber entities, comprising: using a supervised training scheme structured to receive training data comprising varied combinations of the predetermined fields, determining a degree of similarity between the varied combinations of the predetermined fields and a subset of retrievably stored data associated with a particular platform subscriber entity; and determining the confidence value based on the token rarity index and the degree of similarity; based on said comparison, causing the first machine learning model to determine the confidence value for a first match between the entity identifier token and the platform subscriber entity; in response to the confidence value exceeding a predetermined threshold, determining at least one relevant network operation for the platform subscriber entity; binding, to the platform subscriber entity, a listener structured to implement a listener condition triggered by the at least one relevant network operation; and in response to determining that the listener condition has been triggered, automatically denying the network operation to the platform sub scriber entity.

2. The method of example 1, further comprising: initiating, to a remote computing system associated with the platform subscriber entity, a transmission comprising an electronic communication message; and in response to at least one of (1) an expiration of a timer associated with the electronic communication message and (2) a receipt of a return communication, implementing the listener condition.

3. The method of example 2, wherein the text data further comprises a second portion, the method further comprising: extracting an additional value associated with at least one of the predetermined fields from the second portion; comparing at least a portion of the additional value with the data associated with the set of platform subscriber entities; based on said comparison, determining the confidence value of the match; in response to the confidence value meeting predetermined criteria, initiating the transmission comprising the electronic communication message.

4. The method of example 3, wherein a parameter associated with the electronic communication message is determined based on a history of network operations between the platform subscriber entity and the platform.

5. The method of example 4, wherein the parameter comprises at least one of electronic communication message content, electronic communication message transmission mode, and a timer setting.

6. The method of example 5, wherein the history of network operations comprises behavioral data associated with the platform subscriber entity.

7. The method of example 6, wherein the behavioral data comprises a response rate, the method further comprising: training a second machine learning model to determine, based at least on the response rate, a second confidence value regarding a particular receipt of a return communication from a particular platform subscriber entity being indicative of a status of the particular platform subscriber entity; determining, via the second machine learning model, the second confidence value for the return communication from the platform subscriber entity; and based on the second confidence value, causing the listener to implement the listener condition.

8. A method comprising: obtaining text data associated with an individual, the text data including values associated with predetermined fields from a first individual, the predetermined fields including a name field; comparing a value stored in the predetermined fields associated with the first individual with data associated with a set of platform users; based on said comparing, determining a confidence score of a first match to the name field of a first platform user based on similarity between other predetermined fields and platform data associated with the first platform user; in response to the confidence score exceeding a threshold, modifying the first platform user to indicate a listener condition, the listener condition implements a user listener to the first platform user that is triggered by a subset of future interaction with the first platform user; and in response to a triggering of the user listener, automatically denying the subset of future interaction with the first platform user.

9. The method of example 8, further comprising: obtaining text data associated with a second individual including values associated with predetermined fields from the first individual, the predetermined fields including the name field; comparing a value stored in the predetermined fields associated with the second individual with data associated with the set of platform users; based on said comparing, determining a confidence score of a second match to the name field of a second platform user based on similarity between other predetermined fields and platform data associated with the second platform user; in response to the confidence score not meeting the threshold, transmitting a user notification to the second platform user soliciting a user response, the user notification based on a recent user interaction with the second platform user; and in response to expiration of a timer associated with receipt of a response to the user notification, denying the subset of future interaction with the second platform user, modifying the second platform user to indicate that the user is deceased.

10. The method of example 9, wherein said determining the confidence score is performed by a trained machine learning model that implements a plurality of decedent data as training data.

11. The method of example 9, wherein said determining the confidence score is performed by a trained machine learning model, the method further comprising: training a first machine learning model to identify the confidence score of the match to the name field and the first platform user based on a name rarity index and similarity between other predetermined fields implementing a supervised training scheme and implementing training data of varied combinations of the predetermined fields.

12. The method of example 9, wherein the predetermined fields include any combination of: a location of death; an age of death of the first individual; a birthdate; a city and/or state of residence; or a name of a surviving family.

13. The method of example 9, further comprising: in response to denying an account interaction of the predetermined set of interactions, determining whether the account interaction is suspicious based a trained behavior model of account interaction, wherein the subset of future interaction is determined by the trained behavior model of account interaction, the trained behavior model of account interaction that implements training data of suspicious interactions of platform users connected to the user listener.

14. The method of example 9, further comprising: in response to denying a recurring account interaction on the predetermined set of interactions, transmitting notice to a party associated with the recurring account interaction that further account interaction will be denied.

15. A tangible, non-transitory, machine-readable medium storing instructions that, when executed by a data processing apparatus, cause the data processing apparatus to perform operations comprising those of any of embodiments 1-15.

16. A system comprising: one or more processors; and memory storing instructions that, when executed by the processors, cause the processors to effectuate operations comprising those of any of embodiments 1-15.

17. A system comprising means for performing any of embodiments 1-15.

What is claimed is:

1. A system for adapting computing platform behavior using machine learning based remote entity lifecycle monitoring, the system comprising:

at least one processor; and at least one memory comprising instructions that, when executed, cause the at least one processor to perform operations comprising:

executing a web crawling agent that collects text data from the Internet;

extracting values associated with predetermined fields from the text data, at least one of the predetermined fields comprising an entity identifier token;

comparing at least a portion of the entity identifier token with a set of platform sub scriber entities;

in response to the comparison, causing a first machine learning model to determine a confidence value for a match between at least one platform subscriber entity of the set of platform subscriber entities and the entity identifier token, wherein the first machine learning model is trained to determine confidence values for matches between entity identifier tokens and platform subscriber entities, and wherein the confidence values are determined based on (1) determining degrees of similarity between varied combinations of the predetermined fields and retrievably stored data associated with platform subscriber entities and (2) determining a token rarity index for a particular entity identifier token; and in response to the confidence value exceeding a predetermined threshold, determining at least one relevant network operation for the platform sub scriber entity;

binding, to the platform subscriber entity, a listener structured to implement a listener condition triggered by the at least one relevant network operation; and in response to determining that the listener condition has been triggered, automatically denying the network operation to the platform subscriber entity.

2. The system of claim 1, further comprising:

initiating, to a remote computing system associated with the platform subscriber entity, a transmission comprising an electronic communication message; and in response to at least one of (1) an expiration of a timer associated with the electronic communication message and (2) a receipt of a return communication, implementing the listener condition.

3. The system of claim 2, wherein the text data further comprises a second portion, further comprising:

extracting an additional value associated with at least one of the predetermined fields from the second portion;

comparing at least a portion of the additional value with the data associated with the set of platform sub scriber entities;

based on the comparison, determining the confidence value of the match; and in response to the confidence value meeting predetermined criteria, initiating the transmission comprising the electronic communication message.

4. The system of claim 3, wherein a parameter associated with the electronic communication message is determined based on a history of network operations between the platform subscriber entity and the platform.

5. The system of claim 4, wherein the parameter comprises at least one of electronic communication message content, electronic communication message transmission mode, and a timer setting.

6. The system of claim 4, wherein the history of network operations comprises behavioral data associated with the platform subscriber entity.

7. The system of claim 6, wherein the behavioral data comprises a response rate, further comprising:

training a second machine learning model to determine, based at least on the response rate, a second confidence value regarding a particular receipt of a return communication from a particular platform subscriber entity being indicative of a status of the particular platform sub scriber entity;

determining, via the second machine learning model, the second confidence value for the return communication from the platform subscriber entity; and based on the second confidence value, causing the listener to implement the listener condition.

8. A method comprising:

extracting an entity identifier token from text data comprising predetermined fields;

comparing at least a portion of the entity identifier token with a set of platform subscriber entities;

in response to the comparison, causing a first machine learning model to determine a confidence value for a match between at least one platform subscriber entity of the set of platform subscriber entities and the entity identifier token, wherein the first machine learning model is trained to determine confidence values for matches between entity identifier tokens and platform subscriber entities, and wherein the confidence values are determined based on determining degrees of similarity between varied combinations of the predetermined fields and retrievably stored data associated with platform subscriber entities; and in response to the confidence value exceeding a predetermined threshold, automatically denying a network operation to the platform subscriber entity.

9. The method of claim 8, further comprising:

initiating, to a remote computing system associated with the platform subscriber entity, a transmission comprising an electronic communication message; and in response to at least one of (1) an expiration of a timer associated with the electronic communication message and (2) a receipt of a return communication, automatically denying the network operation.

10. The method of claim 9, further comprising:

extracting an additional value associated with at least one of the predetermined fields from the text data;

comparing at least a portion of the additional value with the data associated with the set of platform sub scriber entities;

based on the comparison, determining the confidence value of the match; and in response to the confidence value meeting predetermined criteria, initiating the transmission comprising the electronic communication message.

11. The method of claim 10, wherein a parameter associated with the electronic communication message is determined based on a history of network operations between the platform subscriber entity and the platform.

12. The method of claim 11, wherein the parameter comprises at least one of electronic communication message content, electronic communication message transmission mode, and a timer setting.

13. The method of claim 11, wherein the history of network operations comprises behavioral data associated with the platform subscriber entity.

14. The method of claim 13, wherein the behavioral data comprises a response rate, further comprising:

training a second machine learning model to determine, based at least on the response rate, a second confidence value regarding a particular receipt of a return communication from a particular platform subscriber entity being indicative of a status of the particular platform sub scriber entity;

determining, via the second machine learning model, the second confidence value for the return communication from the platform subscriber entity; and based on the second confidence value, denying the network operation.

15. One or more non-transitory computer-readable media having computer-executable instructions stored thereon, the instructions, when executed by at least one processor of a computing system, causing the computing system to perform operations comprising:

executing a web crawling agent that collects text data from the Internet;

extracting an entity identifier token from the text data;

comparing at least a portion of the entity identifier token with a set of platform subscriber entities;

in response to the comparison, causing a first machine learning model to determine a confidence value for a match between at least one platform subscriber entity of the set of platform subscriber entities and the entity identifier token; and in response to the confidence value exceeding a predetermined threshold, determining at least one relevant network operation for the platform subscriber entity;

binding, to the platform subscriber entity, a listener structured to implement a listener condition triggered by the at least one relevant network operation; and in response to determining that the listener condition has been triggered, automatically denying the network operation to the platform subscriber entity.

16. The media of claim 15, the operations further comprising:

initiating, to a remote computing system associated with the platform subscriber entity, a transmission comprising an electronic communication message; and in response to at least one of (1) an expiration of a timer associated with the electronic communication message and (2) a receipt of a return communication, implementing the listener condition.

17. The media of claim 16, the operations further comprising:

extracting an additional value from the text data;

comparing at least a portion of the additional value with the data associated with the set of platform subscriber entities; and based on the comparison, determining the confidence value of the match;

in response to the confidence value meeting predetermined criteria, initiating the transmission comprising the electronic communication message.

18. The media of claim 17, wherein a parameter associated with the electronic communication message is determined based on a history of network operations between the platform subscriber entity and the platform, the history of network operations comprising behavioral data.

19. The media of claim 18, wherein the parameter comprises at least one of electronic communication message content, electronic communication message transmission mode, and a timer setting.

20. The media of claim 18, wherein the behavioral data comprises a response rate, the operations further comprising:

training a second machine learning model to determine, based at least on the response rate, a second confidence value regarding a particular receipt of a return communication from a particular platform subscriber entity being indicative of a status of the particular platform sub scriber entity;

determining, via the second machine learning model, the second confidence value for the return communication from the platform subscriber entity; and based on the second confidence value, causing the listener to implement the listener condition.

* * * * *